3,550,126
MONOPULSE RADAR APPARATUS
Herman Michel van Hijfte and Bernard Gellekink, Hengelo, Netherlands, assignors to N.V. Hollandse Signaalapparaten, Hengelo, Overijsel, Netherlands, a firm of the Netherlands
Filed Jan. 21, 1969, Ser. No. 792,456
Claims priority, application Netherlands, Jan. 24, 1968, 6801015
Int. Cl. G01s 9/22
U.S. Cl. 343—16      5 Claims

ABSTRACT OF THE DISCLOSURE

A monopulse radar apparatus features a delay line canceller fed with one of the coherently detected output signals from the receiver. A gate is controlled by broad range gating pulses for coarsely selecting target signals from the output signal of the delay line canceller, and a range error detector is responsive to the selected target signals to produce a range error signal. A pulse regenerator is responsive to the selected target signals to produce standard output pulses; whereby, at least during a lock-on procedure, the range error signal is used for controlling the instant of occurrence of said broad range gate pulses, while the standard output pulses are used as narrow range gate pulses for controlling the gate circuit in each angle tracking channel.

---

The main patent application describes a monopulse radar apparatus for the automatic tracking of a moving target, comprising a transmitter for emitting pulses of microwave energy, a receiver for the reception of echo signals in at least two receiving patterns located symmetrically with respect to the bore sight axis, and for each angle coordinate, a tracking circuit controlled by an error signal, the magnitude and the sign of which depend upon the amplitude and/or phase relationship of at least two intermediate frequency signals varying in accordance with the target deviation from said bore sight axis, which intermediate frequency signals are produced by the receiver in response to the echo signals, the error signal being derived from audio signals obtained by coherent detection of said intermediate frequency signals, the frequency of said audio signals corresponding to the Doppler frequency shift of the echo signals due to the radial velocity of the target relative to the radar apparatus, and whereby said echo signals have been selected by means of narrow range gate pulses applied to a gate circuit present in each angle tracking channel.

As has been set forth in detail in the main patent application, such a monopulse radar apparatus is capable of tracking a target even if the target echoes are 20 db down with respect to simultaneously received clutter echoes.

An object of the present invention is to improve this type of monopulse radar apparatus in a manner such that the preliminary locking of this radar to a target to be tracked, whose azimuth and approximate range have been determined by means of, for example, a search radar, can be effected rapidly, even if the target echoes, at the time of the lock-on operation, are obscured by simultaneously received clutter echoes.

According to the invention a monopulse radar apparatus of the kind mentioned in the preamble, to this end, comprises first circuit means having an input circuit including at least a delay line canceller fed with one of the said coherently detected output signals from the receiver, said first circuit means comprising selecting means controlled by broad range gating pulses for coarsely selecting target signals from the output signal of said delay line canceller, range error detection means responsive to said selected target signals to produce a range error signal, and pulse regenerating means responsive to said selected target signals to produce standard output pulses; whereby, at least during the lock-on procedure, the range error signal is used for controlling the instant of occurrence of said broad range gate pulses, whilst the standard output pulses are used as narrow range gate pulses for controlling the gate circuit in each angle tracking channel.

In order that the invention may be readily carried into effect it will now be described in detail, by way of example, with reference to the accompanying diagrammatic drawings, in which.

Figure 1:
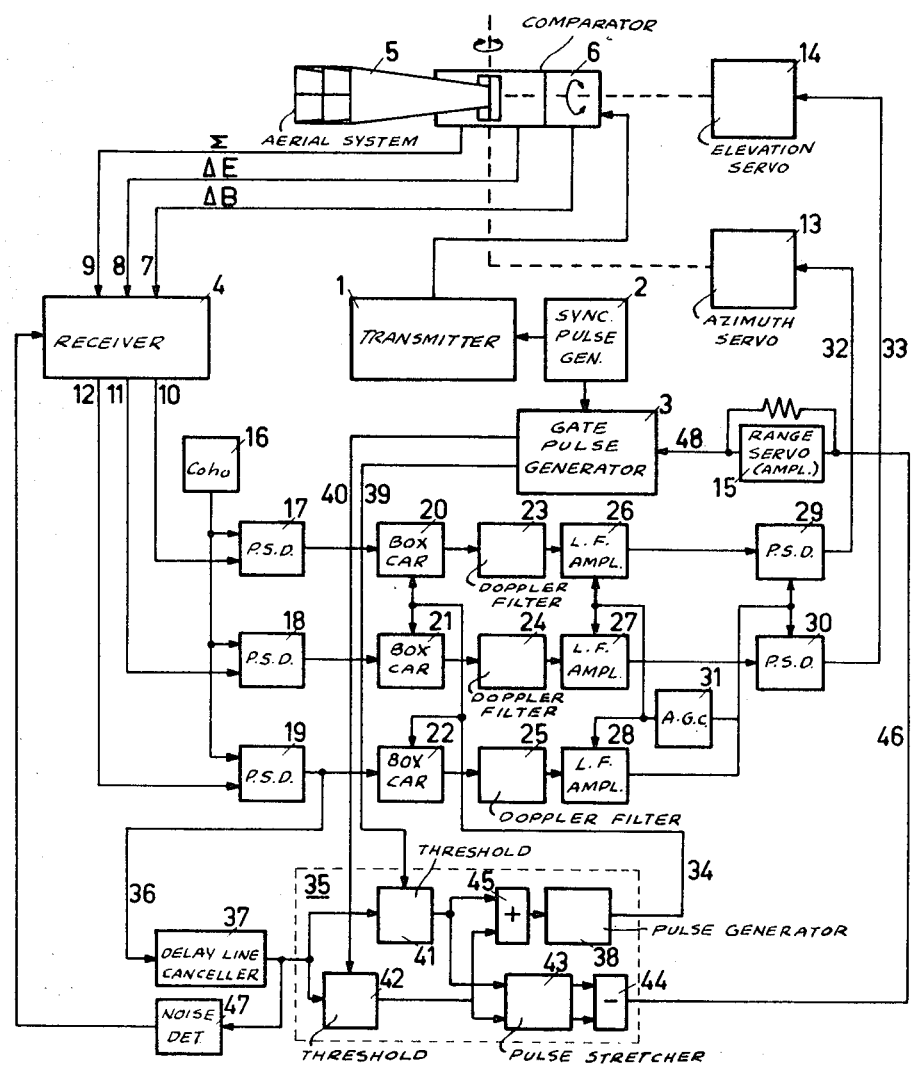
FIG. 1 is a block diagram of a possible embodiment of the monopulse radar apparatus according to the invention.

Like reference numerals denote like parts in FIGS. 1, 4, 5 and 6.

FIG. 1 shows the block diagram of a monopulse radar apparatus of the so-called sum and difference type which permits tracking of a moving target in two angle coordinates and in range, despite the simultaneous reception of comparatively strong clutter echoes. This block diagram largely corresponds with that of a monopulse radar apparatus described and shown in FIG. 1 of the main patent application U.S. application No. 685,987/67.

In conformity therewith the block diagram shown in the present FIG. 1 comprises a transmitter 1, a synchronizing pulse generator 2, a gate pulse generator 3 and a receiver 4. Through an aerial system 5, the micro wave energy produced by the transmitter is pulsed in step with the synchronizing pulses produced by the generator 2. In accordance with the sum and difference type of operation, the reflected energy received in the four sections of the aerial system is converted by means of a comparator 6 into an elevation difference signal $\Delta E$, an azimuth difference signal $\Delta B$ and a sum signal $\Sigma$. These signals $\Delta B$, $\Delta E$ and $\Sigma$ are applied through waveguides 7, 8 and 9 to the receiver 4 in which they are transformed to a predetermined intermediate frequency and amplified in separate channels (not shown). To eliminate any fluctuations occurring due to variations in the target range or in the reflecting surface of the target, the intermediate-frequency difference signals $\Delta E_{IF}$ and $\Delta B_{IF}$ are normalized relative to the intermediate frequency sum signal $\Sigma_{IF}$ so that the amplitude ratios $\Delta E/\Sigma$ and $\Delta B/\Sigma$ provide a true measure of the magnitude of the target deviation from the bore sight axis. The I.F. output signals $\Delta B_{IF}$, $\Delta E_{IF}$ and $\Sigma_{IF}$ occur at the receiver outputs 10, 11 and 12 respectively and contain an amplitude and a phase information which is a measure of the magnitude and sense of the target deviation from the bore sight axis. These I.F. signals, therefore, may be utilized to develop the error signals required for the control of azimuth-, elevation- and range-tracking servos 13, 14 and 15 respectively. To permit tracking of a moving target in the presence of comparatively strong clutter echoes, the error signals required are derived from audio signals obtained by coherent detection of the I.F. signals, said audio signals corresponding in frequency to the Doppler frequency shift of the echo signals due to the radial velocity of the target relative to the radar apparatus.

To this end, the monopulse radar apparatus comprises a plurality of Doppler signal detectors in which the I.F. output signals from receiver 4 are subjected to the said coherent detection. Use is made of a reference signal, which is a replica of the transmitter frequency transformed to the intermediate frequency, so that the Doppler signals produced by the movement of the target and imposed on the I.F. signals are obtained with true amplitude and phase. Said reference signal is produced by means of a coherent oscillator 16. In the embodiment described the said Doppler signal detectors comprise each in order of succession, phase sensitive detectors 17, 18 and 19 respectively to which the relevant I.F. signal and the said reference signal are applied, boxcar detectors 20, 21 and 22 respectively for stretching the output pulses of said phase sensitive detectors, and connected to the output of said boxcar detectors Doppler filters 23, 24 and 25 respectively providing the audio-frequency output signals. As has been set forth in greater detail in the main patent application, it appears that the amplitude and phase information required for automatic tracking remains unaltered in the audio signals, irrespective of the fact whether the target echo is free of clutter or not. To determine the angle error signals, the audio frequency output signals from the Doppler filters 23, 24 and 25 are applied through low-frequency linear amplifiers 26, 27 and 28 to error detectors which in this example are constituted by phase-sensitive detectors 29 and 30. The LF-linear amplifiers 26, 27 and 28 are provided with an automatic gain control system 31 which is connected to the output of LF-linear amplifier 28. The output signal of amplifier 28 is also fed as a reference signal to the phase-sensitive detectors 29 and 30. The phase-sensitive detectors 29 and 30 operate on the applied signals to produce the desired angle error signals, that is to say, phase-sensitive detector 29 provides the azimuth error signal which is applied through a line 32 to azimuth servo 10, whereas phase-sensitive detector 30 provides the elevation error signal which is applied through a line 33 to elevation servo 14.

Referring to the operation of the Doppler signal detectors mentioned, it may be observed that each one of these detectors comprises, in order of succession, a phase-sensitive detector, a boxcar detector and a Doppler filter. Phase-sensitive detectors are well-known to produce an output signal the polarity of which depends on the phase difference between the input signal and the reference signal. Assuming the reference signal to be frequency constant, this implies that the phase-sensitive detectors in the present use provide a unipolar output pulse of constant amplitude for each echo from a fixed target (clutter without internal clutter motion). However, in practice phase variations may occur due to the fact that the reference signal provided by the coherent oscillator is not wholly frequency constant (system jitter) and that the fixed target is possibly not quite free of internal clutter motion. As a result of these phase variations said phase-sensitive detectors produce, for echoes from a fixed target with internal clutter motion, pulses of on the average constant amplitude with a bipolar video pulse superimposed on each of said pulses. These video pulses show an amplitude modulation corresponding to an audio-frequency signal ($\omega_{clutter\ motion} + \omega_{system\ jitter}$). On the other hand, for echoes from a moving target, they produce bipolar video pulses which show an amplitude modulation corresponding to an audio-frequency signal ($\omega_{Doppler} + \omega_{system\ jitter}$). The boxcar circuits each determine the envelope of the output pulses from the relevant phase-sensitive detector. The frequency spectrum of the envelope signal contains not only the Doppler frequency but also frequency components which correspond to the phase variations caused by the system jitter and internal clutter motion. In view of the variations in Doppler frequency shift, as may occur due to a variation in radial speed of the tracked target, the Doppler filters connected to the output of the boxcar circuits have a comparatively large passband. This passband is, for example, of the order of magnitude of half the pulse recurrence frequency (for example from 150 c./s to 2 k.c./s). Consequently such a filter passes not only the Doppler frequency but also the frequency components occurring due to the system jitter as well as at least part of the frequency components occurring due to the internal clutter motion. These frequency components, if passed by the filter, determine an interference level. The height of this interference level is in the most unfavourable case directly proportional to the number of echoes from fixed targets that are received in response to a pulse transmitted. To prevent the interference level from reaching a value at which the Doppler signal can no longer be detected, narrow range gate pulses are applied through line 34 to each of the boxcar circuits to make them respond only to the signals from the target to be tracked and to the clutter signals received almost simulaneously therewith. Such range selection in the angle tracking channels carried out with narrow range gate pulses is naturally possible only if the target range is known with an accuracy up to a few yards. However, during the lock-on procedure which precedes the automatic tracking, the target range is usually known with considerably lower accuracy so that the radar operator can effect a lock-on of the monopulse radar apparatus only with great difficulty and much loss of time.

This difficulty is overcome by the present monopulse radar apparatus, which comprises first circuit means 35 having an input circuit including at least a delay line canceller 37 fed with one of the said coherently detected output signals from the receiver, said first circuit means 35 comprising selecting means 41, 42 controlled by broad range gating pulses for coarse selection of target signals from the output signal of said delay line canceller 37, range error detection means 44 responsive to said selected target signals to produce a range error signal, and pulse regenerating means 38 responsive to said selected target signals to produce standard output pulses; whereby, at least during the lock-on procedure, the range error signal is used for controlling the instant of occurrence of said broad range gate pulses, whilst the standard output pulses are used as narrow range gate pulses for controlling the gate circuit in each angle tracking channel.

The broad range gate pulses are produced by the gate pulse generator 3 and each consist of an early and a late gate pulse which are applied to said first circuit means 35 through leads 39 and 40 respectively. In the embodiment used here, said selecting means comprises two threshold circuits 41 and 42 connected to the output of the delay line canceller 37. The threshold level of these circuits are controlled by the early and the late broad gate pulses respectively. The output of each one of said threshold circuits are connected on the one hand through a pulse stretcher 43 to a difference forming circuit 44 for producing the range error signal, and on the other hand through a sum forming circuit 45 to a blocking oscillator constituting the pulse regenerator 38 for producing the standard output pulses. The output of the difference forming circuit 44 is connected through lead 46 to the range servo 15 which is constituted by an amplifier, whose output signal controls a time modulator (not shown) forming part of the gate pulse generator 3. The output from pulse regenerator 38 is connected through lead 34 to an input of each of the boxcar circuits 20, 21 and 22.

The delay line canceller 37 may be of the type usually employed with M.T.I. (moving target indication) techniques. Therefore it will be sufficient here to mention that such a device comprises at least two video channels. One channel is an ordinary video channel, in the other chanel the video signals are delayed over one pulse recurrence period. The output signals from the two channels are subtracted from each other. The operation of the delay line canceller corresponds to that of a filter which suppresses the DC-component from fixed targets and which pases the AC-component from moving targets.

An optimum filter action is obtained if the signal-tonoise level of the input signal of the delay line canceller is equal to the cancellation ratio. In this case the noise and the canceller residue are equal. Assuming the delay line canceller to have a constant amplification factor (AGC incorporated if necessary), the desired optimum filter action may be obtined in a simple manner by adjusting the AGC-control of the receiver I.F. stages so that the noise level at the output of the delay line canceller is equal to half the saturation value. Each echo from a fixed target will then be reduced to a value which is at most equal to half the saturation value. Each echo from a moving target exceeds this value. In the embodiment of FIG. 1 the AGC-control of the reciver-I.F. stages is adjusted by a control voltage which is produced by a noise-detector 47 connected to the output of the delay line canceller.

Figure 2:
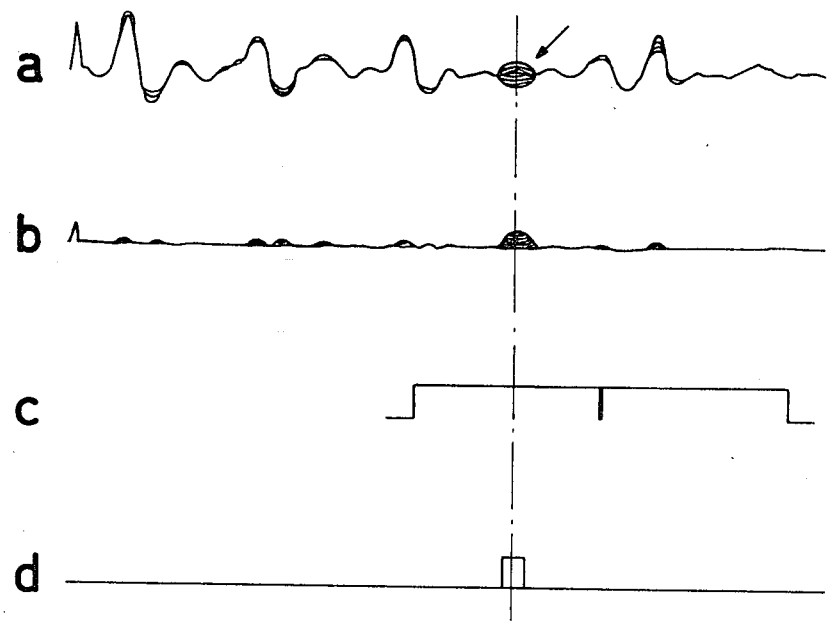
FIGS. 2 and 3 show several diagrams for explanation.

The input signal of the delay line canceller 37 in this embodiment is formed by the bipolar video signal appearing at the output of the phase-sensitive detector 19 after coherent detection of the I.F. sum signal $\Sigma_{IF}$. The amplitude of this video signal in successive pulse recurrence periods will show a distinct variation in the case of moving targets only. For illustration FIG. 2a shows the superimposition of a number of video signals received in successive pulse recurrence periods. In this figure an arrow is used to indicate the position in which the superimposed video signals have the largest amplitude variations. They are caused by a moving target. The remaining amplitude variations of the superimposed video signals are smaller and are caused by the system jitter and internal clutter motion if any. In view of the fact that the delay line canceller suppresses the DC-component from the fixed targets and passes the AC-component from the moving target the output signal from the delay line canceller is a bipolar video signal, as is its input signal. This bipolar video signal is converted by rectification into a unipolar video signal, as illustrated in FIG. 2b.

As is well-known, the lock-on procedure may be divided into two phases, i.e. a first phase in which the radar operator ensures that the aerial 5 is slewed in azimuth to the proper bearing of the target to be tracked and that the gate pulse generator is adjusted in range so that the radar will lock on to the target to be tracked during the subsequent second phase in which the aerial is made to perform an elevation scan. To simplify the drawing, the operator-controlled means have been omitted in FIG. 1.

Assuming that the unipolar video signal shown in FIG. 2b is the signal which appears at the output of the delay line canceller 37 during the elevation scan and further assuming that the broad range gate pulses produced by the gate pulse generator occurs during the time interval shown in FIG. 2c, the operation of the first circuit means 35 may be explained as follows:

In this circuit arrangement the said unipolar video signal is applied to the two threshold circuits 41 and 42. The threshold level of these threshold circuits is normally so that the signals applied are not passed. During the time interval in which the early and late broad gate pulses are applied to these threshold circuits, the threshold level is reduced to such an extent that the canceller residue is suppressed but the target signals exceeding the threshold level are passed.

The threshold circuits 41 and 42 together with the pulse stretchers 43 and the difference forming circuit 44 constitute a time discriminator whose output signal is a measure of the range tracking error. This signal is applied through a lead 46 to amplifier 15 which thus provides a control voltage. This control voltage is applied through a lead 48 to the gate pulse generator 3 so as to thereby cause the instant of occurrence of the broad range gate pulses to be adjusted so that they overlap the target signals.

The sum forming circuit 45 connected to the output of both the threshold circuits 41 and 42 also applies the target signals, insofar they exceed the said low threshold level, to the pulse regenerator 38. Each time the latter receives such a target signal it produces a standard output pulse as illustrated in FIG. 2d. These standard output pulses are used as narrow range gate pulses in the angle tracking channels to which they are fed by way of lead 34.

The broad range gate pulses cover a range increment which extends, for example, from 1 km. before to 1 km. after the assumed range of the target. It will be evident that the use of such broad range gate pulses makes it easy for the radar operator to select the target to be tracked in range. The use of such broad range gate pulses is made possible by the fact that the narrow range gate pulses required for the range selection in the angle tracking channels are automatically produced once the target to be tracked has been coarsely selected in range.

The monopulse radar apparatus of FIG. 1 makes it easier for the operator to lock the radar on to a predetermined target. This radar apparatus is capable of subsequently tracking this selected target in angle and range, even if relatively strong clutter echoes are received simultaneously with the target echoes. The sub-clutter-trackability of the embodiment shown in FIG. 1, however, is not optimum, since the narrow range gate pulses required during tracking cannot be automatically produced without the use of the broad range gate pulses.

Figure 4:
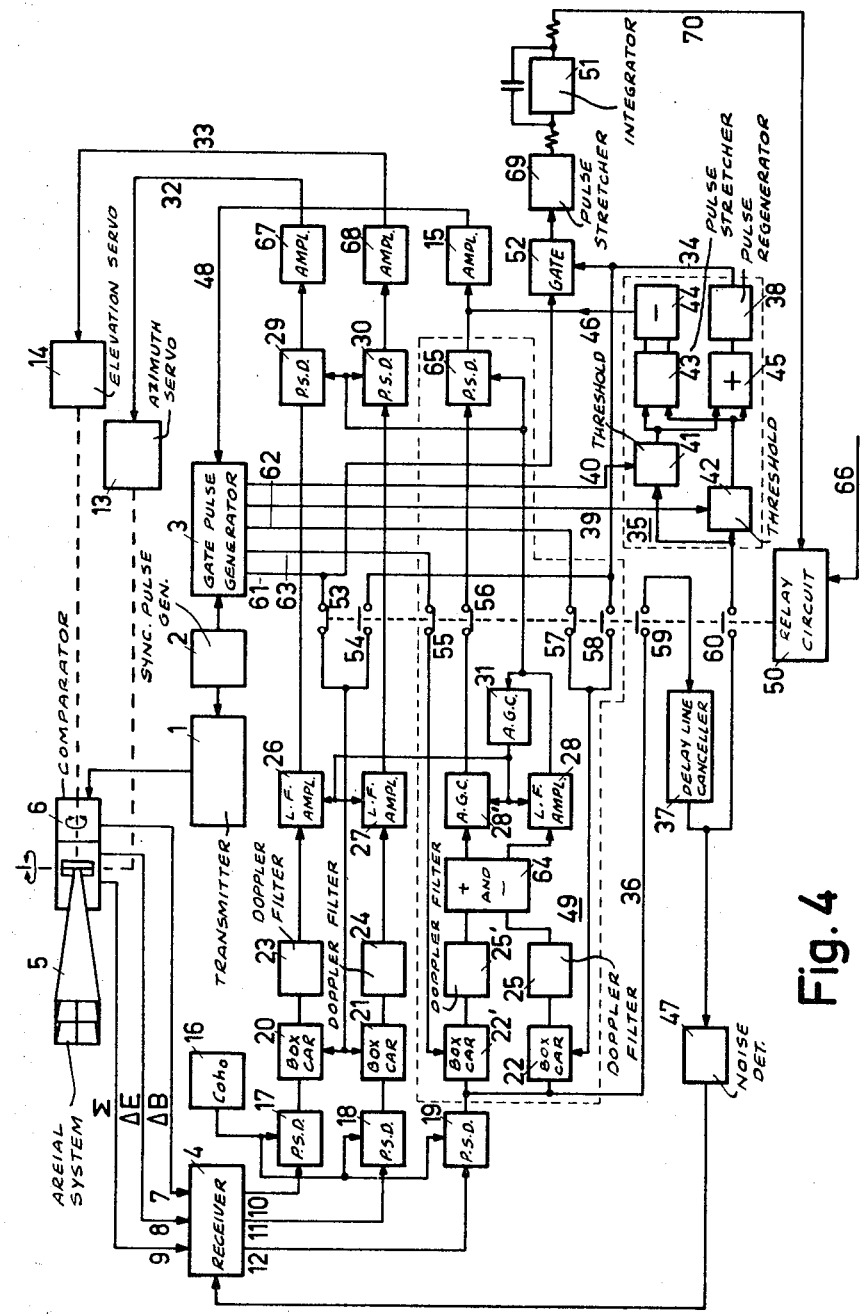
FIG. 4 is a block diagram of a preferred embodiment of the monopulse radar apparatus according to the invention.

Improved sub-clutter-trackability is obtained with the embodiment shown in FIG. 4. This preferred embodiment largely corresponds to the embodiment of FIG. 1, but is distinguished therefrom in that the gate pulse generator 3 of the radar apparatus is adapted to produce broad range gate pulses as well as narrow range gate pulses, the instant of occurrence of the latter being in fixed time relationship to the instant of occurrence of the broad range gate pulses. The radar apparatus further comprises:

Second circuit means 49 including selecting means 22, 22' controlled by the narrow range gate pulses from said gate pulse generator 3 for fine selection of target signals from said coherently detected output signal of the receiver and range error detection means 65 responsive to said fine-selected target signals to produce a range error signal;

Switching means 50 which in the first switching position apply the standard output pulses from said first circuit means 35 as narrow range gate pulses to the gate circuit present in each angle tracking channel, and which in the second switching position apply the narrow range gate pulses from the gate pulse generator 3 to the said selecting means of said second circuit means 49 and to the gate circuits in the angle tracking channels, simultaneously therewith effecting the switching-off of the said first circuit means 35;

A Miller integrator 51, one input circuit of which comprises a gate circuit 52 which is controlled by the narrow range gate pulses from said gate pulse generator 3 and through which the standard output pulses from said first circuit means 35 are applied to the Miller integrator, the integrator output signal after having reached a predetermined value causing the said switching means 50 to be switched from the first to the second switching position.

Figure 3:
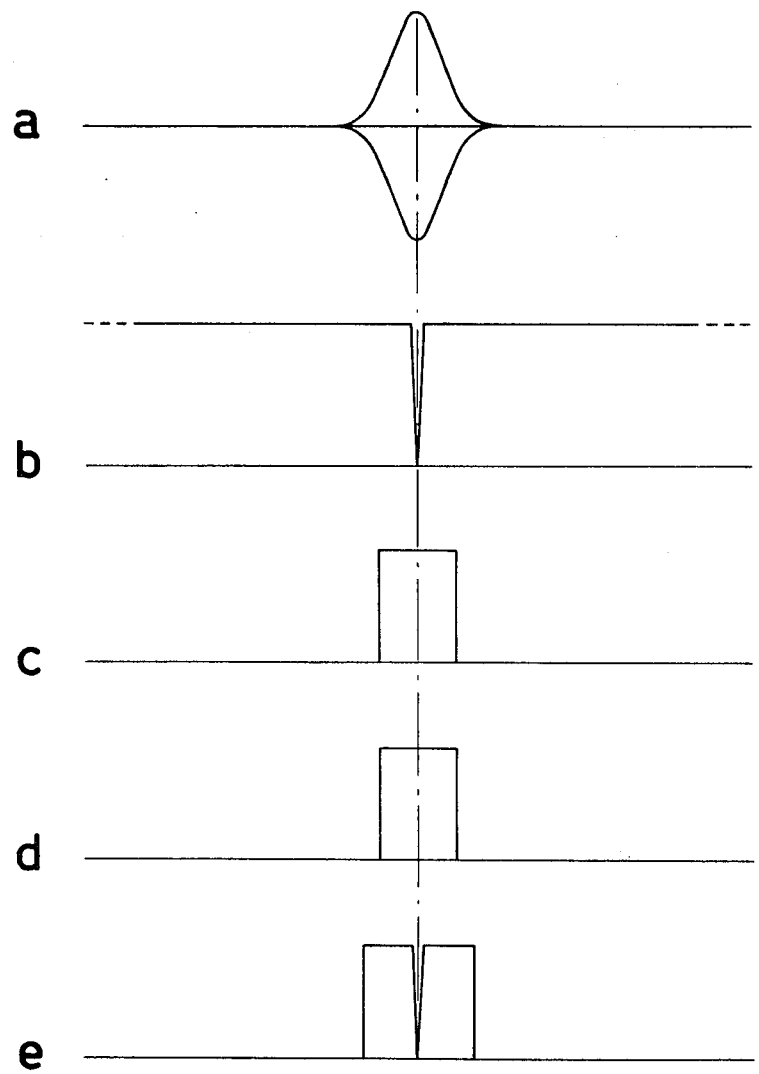

As regards the narrow range gate pulses produced by the gate pulse generator 3, distinction has to be made between a first kind and a second kind of narrow gate pulses. The narrow gate pulses of the first kind consist of single pulses having a duration equal to that of the standard output pulses from the pulse regenerator 38. The narrow gate pulses of the second kind each consist of narrow early and late gate pulses. The time relationship between the gate pulses produced by the gate pulse generator is illustrated in FIG. 3, where FIG. 3b shows early and late broad gate pulses, FIG. 3c shows a single narrow gate pulse and FIG. 3e shows early and late narrow gate pulses.

The said switching means comprises a relay circuit 50 and contacts 53 to 60 controlled by it.

The position in which these contacts are shown in the figure in the second switching position which occurs when the relay circuit 50 is in its quiescent state. In this state the first circuit means 35 is inoperative, since lead 36 is interrupted by the normally open contacts 59 and 60. The boxcar circuits 20 and 21 are then controlled by the narrow gate pulses of the first kind which are applied to the boxcar circuits through lead 61 and the normally closed contacts 53. Furthermore, in this case, the early and late narrow gate pulses are used for controlling the boxcar circuits 22 and 22' which are connected to the output of the phase-sensitive detector 19. In fact, the early narrow gate pulses are applied to the boxcar circuit 22 through a lead 62 and the normally closed contact 57, whereas the late narrow gate pulses are applied to the boxcar circuit 22' through a lead 63 and the normally closed contacts 55. The boxcar circuits 22 and 22' form part of the second circuit means 49, further comprise a sum- and difference forming network 64, two Doppler filters 25 and 25' through which the boxcar circuits 22 and 22' are connected to the said sum and difference forming network, a phase-sensitive detector 65 and two low-frequency amplifiers 28 and 28' through which the difference output and the sum output, respectively, of the sum and difference forming network are connected to said phase-sensitive detector 65.

When the relay circuit 50 is in the active state, the contacts 53 to 60 are in the position not shown, i.e., the first switching position. In this state the first circuit means 35 are operative, since the contacts 59 and 60 are closed and the input lead 36 is no longer interrupted. In this case only the broad early and late range gate pulses are used. They are applied through leads 39 and 40 to the two threshold circuits 41 and 42 of the first circuit means 35. The boxcar circuits 20 and 21 are then controlled by the standard output pulses from pulse regenerator 38, which are applied to the boxcar circuits 20 and 21 through lead 34 and the closed contacts 54. The standard output pulses from pulse regenerator 38 are also applied through the contacts 58 to the boxcar circuit 22. Boxcar circuit 22', in this case, does not receive any gate pulses and therefore cannot respond to the output signal from the phase-sensitive detector 19. Furthermore the connection between the low-frequency amplifier 28' and the phase-sensitive detector 65 is interrupted by the open contacts 56.

The monopulse radar apparatus described operates as follows: To initiate the lock-on procedure, a start signal is given through a lead 66 so as to thereby activate relay circut 50. Contacts 53 to 60 then assume the position not shown. The pulse radar apparatus then operates in the manner described with reference to FIG. 1. In accordance therewith the first circuit means 35 is supplied with the echo signals received during the elevation scan, and in response thereto will produce on the one hand a signal which is a measure of the range error and on the other hand will produce the standard output pulses. The latter are applied as narrow gate pulses to the boxcar circuits 20, 21, and 22 which thus respond to the coherently-detected output signals from the phase-sensitive detectors 17, 18 and 19. The phase-sensitive detectors 29 and 30 then provide the angle error signals required for steering the aerial. The reference signal applied to the phase-sensitive detectors 29 and 30 is dervied from the output of the low-frequency amplifier 28. This reference signal is also applied to the phase-sensitive detector 65 which, however, does not produce an output voltage, since the boxcar circuit 22' does not receive any gate pulses, whilst, moreover, the connection between low-frequency amplifier 28' and phase-sensitive detector 65 is interrupted by the then open contacts 56. The angle error signals are amplified in the amplifiers 67 and 68 and are then applied to the azimuth servo 13 and the elevation servo 14. The range error signal is applied through lead 48 to the gate pulse generator 3 after first having been amplified in the amplifier 15. As a result, the instant of occurrence of the broad range gate pulses is controlled so that the centre of the broad early and late gate pulses, as shown in FIG. 3b, coincides with the centre of the video output signals of phase-sensitive detectors 17, 18 and 19, said video output signals being shown in FIG. 3a. The instant at which the single narrow gate pulses occur at the output of the gate pulse generator 3 then corresponds, as shown in FIG. 3c, with the instant at which the standard output pulses, shown in FIG. 3d, occur at the output of pulse regenerator 38, whilst the instant at which the narrow early and late gate pulses, shown in FIG. 3e, occur at the output of gate pulse generator 3 is such that the centre of the narrow early and late gate pulses coincides with the maximum value of the input video of the boxcar circuits. Since the narrow gate pulses shown in FIG. 3c and the standard output pulses shown in FIG. 3d now occur simultaneously at the gate circuit 52, the standard output pulses are passed and applied through a pulse stretcher 69 to the Miller integrator 51. The operation of pulse stretcher 69 is such that, on receipt of the standard output pulses, it supplies a positive-going output current to the Miller integrator which thus produces a negative-going output voltage. This output voltage is applied through a lead 70 to the relay circuit 50 which returns to its quiescent state as soon as the said negative-going voltage drops below a predetermined value. With the relay circuit 50 in the quiescent state the contacts 53 to 60 are in the position shown, so that:

the input circuit of the first circuit means 35 is interrupted by the contacts 59 and 60;
the control of the boxcar circuits 20 and 21 is taken over by the narrow gate pulses produced by gate pulse generator 3 and shown in FIG. 3d; the control of the boxcar circuits 22 and 22' is taken over by the narrow early and late gate pulses, whilst the connection between the low-frequency amplifier 28 and the phase-sensitive detector 65 is established by closure of the contacts 56.

The range error signal is now produced by the circuit arrangement 49. The boxcar circuits 22 and 22' respond to the video signal from the phase-sensitive detector 19 at the instant of the occurrence of the gate pulses (shown in FIG. 3a) applied to the said boxcar circuits. If the instant of occurrence of the narrow early and late gate pulses is adjusted correctly the output pulses from these boxcar circuits are equal in amplitude. The sum signal produced by the sum and difference forming network 64, after amplification in amplifier 28, is applied as a reference signal to the phase-sensitive detectors 29, 30 and 65. The difference signal provided by the sum and difference forming network 64 is zero if the narrow early and late gate pulses are adjusted correctly. The phase-sensitive detector 65 then receives no input signal and hence provides no error signal, which is correct on the ground of the assumption that the narrow early and late gate pulses are adjusted correctly. If the adjustment of the instant occurrence of the narrow early and late gate pulses is no longer correct, the amplitudes of the output signals from boxcar circuits 22 and 22' will differ from each other. The phase-sensitive detector 65 then produces an output signal the amplitude of which is a measure of the range error. The sense of the range error is determined in the phase-sensitive detector 65 and depends upon the polarity of the difference signal produced by the sum and difference forming network 64. The angle error signals are produced in the phase-sensitive detectors 29 and 30 in the normal manner, since, the fact that the control has been taken over by the narrow gate pulses from gate pulse generator 3 does not affect the normal operation of the boxcar circuits 20 and 21.

In the embodiments described hereinbefore, the input signal used for the delay line canceller is the sum signal, since this signal is readily available with a monopulse radar apparatus of the sum and difference forming type. If, however, the invention is applied to monopulse radar apparatus based on amplitude and/or phase comparison it is fundamentally possible to use one of the incoming signals to be compared, for example the strongest signal, as the input signal for the delay line canceller.

Figure 5:
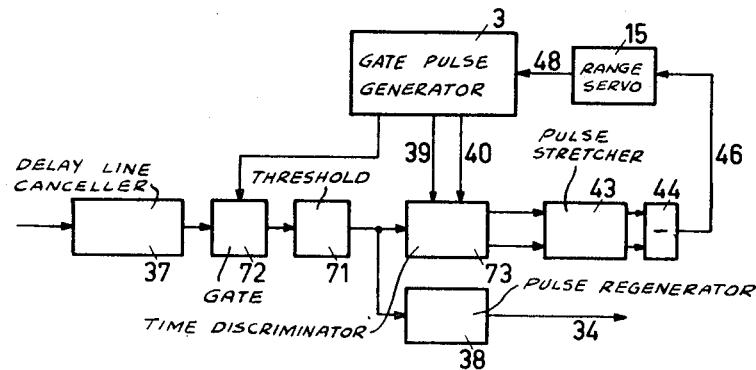
FIGS. 5 and 6 are block diagrams of possible modifications of a device as used in the embodiments of FIGS. 1 and 4.

The first circuit means 35 is not limited to the embodiments shown in FIGS. 1 and 4. FIG. 5 shows a possible modification in which, instead of two threshold circuits 41 and 42 gated by early and late broad gate pulses respectively, use is made of a single threshold circuit 71 which is not gated. The coarse range selection required is here effected by means of a separate gate circuit 72 which is controlled by the broad range gate pulses from gate pulse generator 3 and through which the output video from the delay line canceller 37 is applied to the threshold circuit 71. The output of the threshold circuit 71 is fed on the one hand to the pulse regenerator 38 and on the other hand to a separate time-discriminator 73 which is controlled by the narrow early and late gate pulses.

Figure 6:
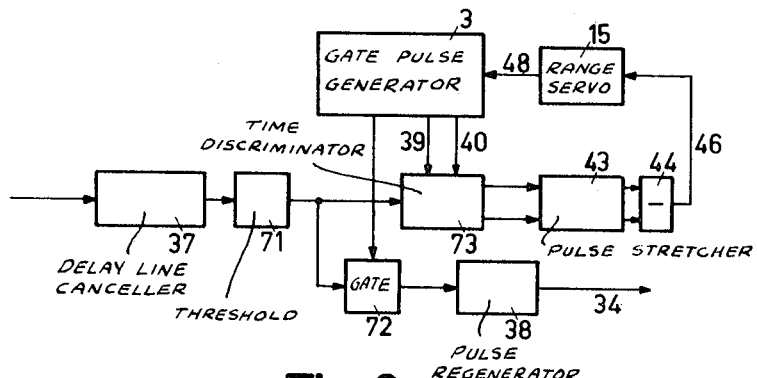

FIG. 6 shows another possibe modification in which the output video from the threshold circuit 71 is applied on the one hand to the pulse regenerator 38 through a single gate circuit 72 controlled by broad gate pulses and on the other hand directly to a time-discriminator 73 controlled by the said broad early and late range gate pulses.

Several other embodiments are conceivable. Although the invention has been explained with reference to certain embodiments, it will be evident that various modifications thereof are possible without departing from the inventive ideas as such.

What we claim is:

1. A monopulse radar apparatus for the automatic tracking of a moving target, comprising a transmitter for emitting pulses of microwave energy, a receiver for the reception of echo signals in at least two receiving patterns located symmetrically with respect to the bore sight axis, and for each angle coordinate, a tracking circuit controlled by an error signal, the magnitude and the sign of which depend upon the amplitude and/or phase relationship of at least two intermediate frequency signals varying in accordance with the target deviation from said bore sight axis, which intermediate frequency signals are produced by the receiver in response to the echo signals, the error signal being derived from audio signals obtained by coherent detection of said intermediate frequency signals, the frequency of said audio signals corresponding to the Doppler frequency shift of the echo signals due to the radial velocity of the target relative to the radar apparatus, and whereby said echo signals have been selected by means of narrow range gate pulses applied to a gate circuit present in each angle tracking channel, wherein said monopulse radar apparatus comprises first circuit means having an input circuit including at least a delay line canceller fed with one of the said coherently detected output signals from the receiver, said first circuit means comprising selecting means controlled by broad range gating pulses for coarse selection of target signals from the output signal of said delay line canceller, range error detection means responsive to said selected target signals produce a range error signal, and pulse regenerating means responsive to said selected target signals to produce standard output pulses; whereby, at least during the lock-on procedure, the range error signal is used for controlling the instant of occurrence of said broad range gate pulses, whilst the standard output pulses are used as narrow range gate pulses for controlling the gate circuit in each angle tracking channel.

2. Monopulse radar apparatus as claimed in claim 1, wherein the gate pulse generator of the radar apparatus is adapted to produce broad range gate pulses as well as narrow range gate pulses, the instant of occurrence of the latter being in fixed time relationship with the instant of occurrence of the broad range gate pulses, and wherein said radar apparatus further comprises:

second circuit means including selecting means controlled by the narrow range gate pulses from said gate pulse generator, for fine-selection of target signals from said coherently detected output signal of the receiver and range error detection means responsive to said fine-selected target signals to produce a range error signal, switching means which in the first switching position apply the standard output pulses from said first circuit means as narrow range gate pulses to the gate circuit present in each angle tracking channel, and which in the second switching position apply the narrow range gate pulses from the gate pulse generator to the said selecting means of said second circuit means and to the gate circuits in the angle tracking channels, simultaneously therewith effecting the switching-off of the said first circuit means; a Miller integrator one input circuit of which comprises a gate circuit which is controlled by the narrow range gate pulses from said gate pulse generator and through which the standard output pulses from said first circuit means are applied to the Miller integrator, the integrator output signal after having reached a predetermined value causing the said switching means to be switched from the first to the second switching position.

3. Monopulse radar apparatus as claimed in claim 1, wherein said selecting means are constituted by two threshold circuits connected to the output of said delay line canceller, the threshold level of these circuits being respectively controlled by the broad early and late range gate pulses, the output of each one of said threshold circuits being connected on the one hand through a pulse stretcher to a difference forming circuit for producing said range error signal and on the other hand through a sum forming circuit to a blocking oscillator constituting the said pulse regenerator for producing said standard output pulses.

4. Monopulse radar apparatus as claimed in claim 1, wherein said selecting means are constituted by a single threshold circuit and a gate circuit controlled by broad range gate pulses; the output signal of the delay line canceller being applied through said gate circuit to said threshold circuit, the latter being connected on the one hand to a separate time-discriminator controlled by the broad early and late range gate pulses for producing the range error signal, and on the other hand to a blocking oscillator constituting the pulse regenerator for producing the said standard output pulses.

5. Monopulse radar apparatus as claimed in claim 2, wherein the said second circuit means comprise:
- two boxcar circuits fed with the said coherently detected output signals from the receiver and, in the second switching position, respectively controlled by narrow early and late range gate pulses,
- a sum and difference forming network and two Doppler filters through which the output signals from the boxcar circuits are applied to the said network, and
- a phase-sensitive detector and two low frequency amplifiers through which the sum signal and the difference signal, respectively, are applied to the said phase sensitive detector for producing the range error signal.

References Cited

UNITED STATES PATENTS 3,427,616    2/1969    Amoruso et al. _____ 343—16

RODNEY D. BENNETT, Primary Examiner

J. G. BAXTER, Assistant Examiner

U.S. Cl. X.R.

343—7.3, 7.7